Patented June 15, 1954

UNITED STATES PATENT OFFICE 2,681,356

2,681,356

EXTRACTION OF OXYGENATED COMPOUNDS FROM OILS WITH AQUEOUS SALT SOLUTIONS

Herbert K. Wiese, Cranford, N. J., assignor to Standard Oil Development Company, a corporation of Delaware No Drawing. Application June 3, 1948, Serial No. 30,968

1 Claim. (Cl. 260—450)

This invention relates to a process for the extraction of organic oxygenated compounds, particularly alcohols, from their solutions in hydrocarbons. The invention is also concerned with a process for the extraction of organic oxygenated compounds from hydrocarbon oils with the simultaneous hydrolysis of the esters present among the oxygenated compounds. More specifically, the invention is concerned with a process for extracting organic oxygenated compounds, particularly alcohols, from hydrocarbons by contact with aqueous salt solutions of organic acids of 3 to about 12 carbon atoms.

It is an object of this invention, therefore, to set forth a process for the separation of organic oxygenated compounds, i. e., alcohols, acids, esters, ketones, aldehydes etc., but particularly alcohols from hydrocarbon oils containing them.

It is another object of this invention to set forth an extraction process for the separation of organic oxygenated compounds, particularly alcohols, from hydrocarbon oils during which the esters present in the hydrocarbon oils are hydrolyzed to alcohols and acids which are simultaneously extracted by the hydrolyzing medium.

These and other objects of the invention may be accomplished according to the process which will be set forth below.

Various processes are known to the art in which a mixture of hydrocarbons and organic oxygen-containing compounds are produced. Some of these processes are the low temperature carbonization of coal, peat and similar materials, destructive hydrogenation of coals, wood, shales, etc. Numerous oxidation processes, particularly oxidation of petroleum oil fraction such as is described in Ellis' Chemistry of Petroleum Derivatives, vol. 1, chapter 36, pages 830 to 845, also yield mixtures of oxygenated compounds and hydrocarbons. This invention is particularly applicable to products obtained from a process whereby hydrogen and oxides of carbon are reacted in the presence of a catalyst to produce synthetic hydrocarbons, water and numerous organic oxygenated compounds. The oxygen-containing compounds produced in this synthesis operation may be a major product or a relatively small by-product depending upon the operating conditions. These oxygenated materials which are extremely valuable as chemicals, consist of a mixture of alcohols, acids, aldehydes, ketones and esters, and are difficult to separate from the hydrocarbon oil, because, first, they are so numerous, secondly, they boil within substantially the same range as the hydrocarbon oils and, thirdly, they often form azeotropes with each other and with the hydrocarbon oils.

Normally, when the products of the above-described synthesis operation are condensed and allowed to settle the condensate separates into a di-phase system, that is, an upper oil layer comprising substantially hydrocarbons and hydrocarbon-soluble oxygen-containing materials and a lower water phase comprising substantially water and water-soluble oxygen-containing materials. The oxygen-containing organic compounds formed in the synthesis operation range from very low molecular weight compounds to very high molecular weight compounds and, therefore, find themselves distributed throughout the oil phase and the water phase depending on their solubilities in these respective phases. In general, it can be said that the bulk of the organic oxygen-containing compounds of one to four carbon atoms will enter the aqueous phase while the bulk of the compounds containing five carbon atoms and more per molecule will be found in the oil layer, although it should be borne in mind that the separation of materials into their respective phases is oftentimes not clean-cut and depends to a large extent upon the conditions involved and the overall composition of the materials in the condensate.

The process of this invention is concerned with the separation and recovery of organic oxygen-containing compounds such as alcohols, acids, ketones, aldehydes etc. from their solutions in hydrocarbon oils. The invention is also concerned with the simultaneous hydrolysis of any esters in the solution to the corresponding alcohols and acids which become extracted by the hydrolyzing medium. The invention is particularly applicable to the products of the previously mentioned hydrocarbon synthesis reaction products resulting from the catalytic hydrogenation of oxides of carbon.

According to one modification of the process of this invention organic oxygen-containing compounds such as alcohols, acids, carbonyls etc. are extracted and any esters are hydrolyzed by contacting the hydrocarbon solution of the oxy-compounds with an aqueous solution of a salt of an organic carboxylic acid containing 3 to about 12 carbon atoms per molecule. The process is preferably carried out in a counter-current operation and preferably in a liquid-liquid operation whereby the oxy-compounds dissolve in the aqueous salt solution forming an extract phase, while the hydrocarbons remain undissolved and constitute the raffinate phase.

The material subjected to extraction, according to the terms of this invention, is complex in nature. It is composed of hydrocarbons including paraffins, olefins and in some cases, small amounts of aromatics. In addition, it contains anywhere up to about 50% or more of oxygen-containing materials, particularly of high molecular weight such as those set out above. In cases where the material is derived from the hydrocarbon synthesis operation, the oil will have dissolved in it alcohols, acids, aldehydes, ketones and esters. The esters predominate among the high boiling compounds, particularly that fraction boiling above 350° F. while carbonyl compounds, that is, aldehydes and ketones, acids, and alcohols, predominate among the oxygen-containing compounds boiling at temperatures up to about 350° F. Ordinarily the amounts of alcohols and acids found decrease with increasing analytical distillation temperatures due undoubtedly to the fact that they undergo esterification reactions during such distillation treatments. The oxygen content of the hydrocarbon oils resulting from the synthesis operation generally runs from one weight percent to about 10 wt. percent.

When esters are present in such mixtures of oxy-compounds they tend to solubilize the other oxy-compounds in the hydrocarbon oils and make their extraction more difficult. Solvent extraction processes developed to date permit the quantitative removal of all oxy-compounds from solutions in hydrocarbons with the exception of esters. These processes, of course, permit the removal of some esters, but by no means is the ester removal quantitative. These esters are valuable products themselves and are even more valuable from the point of view of the alcohols and acids obtainable therefrom. It is extremely important, therefore, that the esters be recovered as such or as their hydrolysis products, and furthermore, that the raffinate be freed of such compounds in order that it may be used as a gasoline or other products, which will not tolerate the presence of such ester contaminants.

The salts employed in the process of this invention are derived from a combination of at least one organic acid of the molecular weight prescribed and an inorganic base, e. g., sodium hydroxide, or, from a combination of an organic acid and an organic base, such as the amines or sulfonium hydroxide. The salt solution may be prepared by adding a pure organic acid or mixture of pure organic acids to an aqueous base to produce the desired extractant. However, it is preferred in this invention to prepare the salt solution by contacting an aqueous solution of the base of desired concentration with a hydrocarbon synthesis product fraction, either oil layer or water layer or both, containing the desired acid or acids. The resulting salt solution is then employed to extract the oxygenated compounds from the hydrocarbon synthesis fraction containing them. For example, if one desires to extract the oxygenated compounds from a hydrocarbon synthesis oil gasoline fraction, a part of the gasoline fraction is first contacted with an aqueous solution of sodium hydroxide until all or a part of the base is neutralized. The aqueous salt solution so produced can then be employed to extract oxygenated compounds from the gasoline fraction either in batch or countercurrent operation at room temperature or at elevated temperatures. Other hydrocarbon fractions containing, for example, $C_{10}$ to $C_{12}$ acids, may likewise be treated with an appropriate base and the resulting salt solution of these acids employed as the extractant. The hydrocarbon synthesis water layer contains considerable amounts of the lower aliphatic carboxylic acids, e. g., $C_3$ to $C_6$ and is an excellent source of acids for the production of organic salts which may be employed according to this invention. Typical salts, therefore, which may be employed are sodium or potassium propionate, sodium or potassium butyrate etc. or mixtures thereof, or other salts of organic acids containing 3 to about 12 carbon atoms per molecule.

Sodium formate and sodium acetate are inferior to water as an extracting medium.

The concentration of salt solution employed depends upon the character of the material which is being extracted from the hydrocarbon solution. For example, a lower concentration of salt in the aqueous solution could be employed when extracting propyl alcohol from oil than when extracting hexyl or octyl alcohol from the oil. Generally, salt solutions in the range of 5 wt. percent to 75 wt. percent, preferably about 10 wt. percent to 60 wt. percent are employed.

The temperature at which the extraction is carried out may vary from about room temperature to the critical temperature of the salt solution being employed. Room temperature is completely satisfactory for carrying out the simple extraction process. However, if it is desired to simultaneously hydrolyze the esters present in the feed to the extraction process, higher temperatures in the neighborhood of 100° to 350° C., preferably 250° to 350° C. are employed, depending upon the ester content of the original feed. Temperature has a marked effect upon the rate of hydrolysis of esters. An acid-free gasoline fraction resulting from a hydrocarbon synthesis run, and containing 2.0 wt. percent esters as $C_6$ esters was subjected to an aqueous solution containing mixed sodium salts of organic acids as the hydrolyzing medium. At a contact time of ten minutes at 200° C., 25 mol percent of the esters were hydrolyzed, while at 250° C. and the same contact time 52.5 mol percent of the esters were hydrolyzed. Organic acids themselves caused no appreciable hydrolysis.

The pressure employed in the extraction process will be that necessary to keep the materials in the liquid phase and will, of course, depend upon the volatility of the feed and the solvent at the extraction temperature, e. g., when the extraction is carried out at about 250° C. with a solution of mixed sodium salts of organic acids, a pressure of 500 to 1,000 lbs. p. s. i. is employed.

Solvent to oil ratios from 0.1 to 1 to as high as 10 or 15 to 1 may be employed although the preferred range is around 0.5 to 2 to 1. When appreciable amounts of esters are present solvent to oil ratios greater than 1 to 1 are used, preferably 2 to 1 and above, if the extraction is being carried out at room temperature. When higher temperatures are employed under these circumstances the solvent to oil ratio is not so critical and ratios as low as 0.5 to 1 may be used.

The ratio of solvent to oil, strength of aqueous salt solution, and the rate of flow of the oil phase are chosen when operating to hydrolyze esters simultaneously in such a manner for a given length of extraction tower that part of the tower, preferably the lower part when the oil phase is traveling up the tower, is employed for the selective extraction of alcohols, acids and carbonyls, completely or in part, and the top of the tower is then employed as a means for hydrolyzing the esters and simultaneous extraction of the acids and alcohols obtained from the hydrolysis of the esters.

It is, of course, understood that this operation can be carried out in two or more extraction towers in series; that is, the first tower selectively extracts the acids, alcohols and carbonyls completely or in part, and the oil phase containing the esters is passed through a second or series of towers where it is contacted with an aqueous solution at the same or different temperature and pressure as the first tower to effect the hydrolysis of esters and extraction of the acids and alcohols produced from the hydrolyzed esters to obtain a hydrocarbon free of all oxygenated compounds.

In order to assist in the extraction of acids from the feed mixture a little free base may be left in the salt solution. This removes the acids from the feed by neutralization. In this manner the solvent may be fortified or side streams of the resulting salt solution may be withdrawn from the extraction tower and neutralized with mineral acid to regenerate the organic acid.

If desired, the acids present in the oxy-compound mixture may be removed completely or partially by neutralization with causitc or other neutralizing agent prior to extraction of the oxy-compound mixture. Prior removal of the acids from the mixture has been found to exert a beneficial effect on the hydrolysis of esters contained therein, indicating, therefore, that the catalytic effect of hydrogen ions produced from the free acid present in the feed is not as pronounced as the hydroxyl ions from the salt solutions.

It has been found that the pH of the salt solution employed in the extraction process is a controlling variable affecting the results obtained. If the salt solution has a pH greater than 8, the organic acids extracted are tied up in the form of their sodium salts. The addition of a mineral acid is then required to liberate the organic acid from its salt. A pH greater than 8 is maintained by the presence of free base in the salt solution. When the pH of the salt solution is greater than 8, salt concentrations of below about 30 wt. per cent will produce an extractant of high capacity for oxygenated compounds.

When employing a solution having a pH below 8, salt concentrations of 30 wt. per cent or higher are required to obtain correspondingly high capacities. If concentrations below about 30 wt. per cent are employed at the lower pH values, the salt solution is inferior to water as an extractant. Any salt concentration above 5 wt. per cent is superior to water at a pH of 8 or above. An advantage of using a pH of below 8, is that it is not necessary to keep adding fresh base to the extractant when recycling it in order to neutralize the acid and, secondly, the use of mineral acid to regenerate the organic acids from their salts is not necessary since the extracted acids are in the free state and, therefore, can be stripped off.

In speaking of the salt solution employed, it is to be understood that the solution is an aqueous solution. However, the aqueous salt solution may be modified by the addition thereto of a low molecular weight water soluble aliphatic alcohol, resulting in a mixed alcohol-aqueous salt solution. Preferred alcohols to be used in such a mixture are methyl alcohol and ethyl alcohol.

In order to demonstrate the effectiveness of the extraction process, the following examples are cited:

*Example 1*

In Table I, there is set forth the results obtained by extracting a hydrocarbon synthesis oil, having a boiling range of 20 to 350° C. and containing approximately 2.5 wt. per cent organic acids, calculated as $C_4$ acid; 13.5 wt. per cent alcohols, calculated as $C_4$ alcohol; 7% carbonyl compounds, calculated as $C_4$ carbonyl and 3.3 wt. per cent esters, calculated as $C_4$ ester. The extractions were carried out at room temperatures, employing various concentrations of sodium salt solutions as indicated. The sodium salt solutions consisted of the stripped extract layers obtained from the aqueous caustic extraction of hydrocarbon synthesis oils and consisted of sodium salts of acids whose average molecular weight corresponded to about that of a $C_5$ aliphatic acid. The data in Table I demonstrate that the salt solutions are good extractants for oxygenated compounds, particularly alcohols. Data are also given showing the results obtained with water for comparative purposes.

Table I also emphasizes the influence of the pH of these salt solutions on their capacity for oxygenated compounds.

TABLE I

| Experiment No. | Approx. Sodium Salt Concentration [1] | Oil Feed | Solvent/Oil Ratio | pH of Extract Phase | Weight Percent Oxygenated Compound in Raffinate | | | | Weight Percent Oxygenated Compound Extracted | | | |
|---|---|---|---|---|---|---|---|---|---|---|---|---|
| | | | | | Acid | Alcohol | Carbonyl | Ester | Acid | Alcohol | Carbonyl | Ester |
| 548-91-A | 0 (water) | a B | 2 | ---- | 1.7 | 6.5 | 5.6 | 2.7 | 32 | 52.5 | 23.0 | 18.0 |
| 548-94-A | do | a C | 2 | ---- | 1.6 | 6.0 | 2.9 | 2.8 | 30 | 52.0 | 55.5 | 15.0 |
| 548-98-A | do | C | 1 | ---- | 1.8 | 8.3 | 4.5 | 3.3 | 21.5 | 34.5 | 29.5 | 0.0 |
| 580-77-E | do | B | 1 | 10.3 | 0.0 | 9.5 | ---- | ---- | 100.0 | 31.0 | ---- | ---- |
| 580-76-D | do | B | 1 | 3.3 | 2.2 | 10.1 | 6.7 | 3.3 | 12.0 | 27.0 | 8.0 | 0.0 |
| 548-93-B | 60 | B | 2 | (b) | 0.0 | 0.8 | ---- | 1.0 | 100.0 | 94.0 | ---- | 69.5 |
| 548-94-B | 30 | C | 2 | (b) | 0.0 | 2.8 | 3.6 | 2.7 | 100.0 | 78.0 | 43.5 | 18.0 |
| 548-98-B | 30 | C | 1 | (b) | 0.0 | 5.9 | 5.2 | 3.0 | 100.0 | 53.5 | 28.5 | 9.0 |
| 580-76-C | 30 | B | 1 | 10.5 | 0.0 | 6.0 | 5.1 | 0.0 | 100.0 | 56.0 | 30.0 | 0.0 |
| 580-98 | 15 | B | 1 | 10.5 | 0.0 | 8.1 | 5.2 | 2.4 | 100.0 | 41.0 | 28.5 | 27.0 |
| 580-77-F | 30 | B | 1 | 8.5 | 0.0 | 7.5 | 5.6 | 3.3 | 100.0 | 45.5 | 23.0 | 0.0 |
| 580-77-G | 30 | B | 1 | 7.3 | 2.4 | 11.1 | 5.5 | 3.3 | 4.0 | 19.0 | 24.5 | 0.0 |
| 580-76-B | 30 | B | 1 | 7.1 | c 4.3 | 13.0 | 7.1 | 3.3 | 0.0 | 5.0 | 3.0 | 0.0 |
| 580-76-A | 30 | B | 1 | 6.0 | c 8.9 | 13.7 | 7.3 | 2.7 | 0.0 | 0.0 | 0.0 | 18.0 |
| 580-144-A | 20 | B | 1 | 7.5 | 2.2 | 11.5 | 6.3 | 3.3 | 12.0 | 16.0 | 13.5 | 0.0 |
| 580-144-B | 30 | B | 1 | 7.5 | 2.1 | 11.0 | 5.8 | 3.3 | 16.0 | 20.0 | 20.5 | 0.0 |
| 580-144-C | 50 | B | 1 | 7.8 | 1.0 | 8.2 | 5.5 | 3.1 | 60.0 | 40.0 | 24.5 | 6.0 |

[1] Sodium salts derived from organic acids present in hydrocarbon synthesis oils, having an average molecular weight of that corresponding to a $C_5$ aliphatic acid.

a Composition of Feed, Wt. Percent:

| | Acid as $C_4$ | Alcohol as $C_4$ | Carbonyl as $C_4$ | Ester as $C_4$ | Total | Boiling range, °C. |
|---|---|---|---|---|---|---|
| B | 2.5 | 13.7 | 7.3 | 3.3 | 26.8 | 20-350 |
| C | 2.3 | 12.7 | 6.4 | 3.3 | 24.7 | 20-350 | b The pH was not determined but was approximately 10.5.
c Increase in acid is due to acid picked up from the aqueous phase. Propionic acid had been added to salt solution to adjust the pH.

Example 2

Table II shows the effect of extracting with salt solutions at high temperature on the hydrolysis of esters present in the feed mixture. Comparative data are given, showing the effect of the salt solution as compared with water as the hydrolysis medium, and also the effect of the presence of free organic acids during the hydrolysis. The data indicate that considerable portions of the ester present in the feed are hydrolyzed to alcohols and acids which are subsequently recovered in the extract phase. It is not advisable to have too much free acid present during the hydrolysis due to the effect thereof on the pH of the salt solution. If the acid builds up the pH of the salt solution drops, and when it reaches a point near 7.0 the rate of hydrolysis is appreciably lowered. The build-up of acid can be avoided by continuously removing a portion of the extraction mixture and stripping the acid therefrom.

Temperatures employed during the extraction-hydrolysis operation should be in the neighborhood of 100–350° C., preferably 250°–350° C. No appreciable hydrolysis of the esters present in the oxygenated compounds-hydrocarbon mixture occurs at room temperature. The hydrolysis rates are extremely slow at room temperature even at the higher pH values, e. g. 10.5, the higher temperatures specified being required.

between room temperature and 350° C. Under these conditions there are formed an extract phase, comprising a solution of the oxygenated compounds in the salt solution and a raffinate phase comprising hydrocarbons. The phases are separated. The oxygenated compounds are recovered from the extract phase by known means, such as fractional distillation or by solvent extraction. Simple stripping of the oxygenated compounds from the extract by fractional distillation is preferred. The oxygenated compounds will then be recovered, usually in the form of their water azeotropes. The solvent may be recycled to the system.

What is claimed is:

In a process for separating preferentially oil-soluble organic oxygenated compounds from a predominantly hydrocarbon mixture comprising acids, esters and at least one preferentially oil-soluble organic oxygenated compound selected from the group consisting of alcohols, aldehydes, and ketones, the steps which comprise contacting said hydrocarbon mixture at a temperature in the range of 250° C. and 350° C. with an aqueous extraction solution containing a salt of a preferentially oil-soluble carboxylic acid having 3 to 12 carbon atoms in the molecule, whereby the esters contained in said mixture are hydrolyzed to acids and alcohols, and stratifying and separating an aqueous extract containing said preferentially oil-soluble organic oxygenated compounds.

TABLE II

[Batch hydrolysis of esters present in 25°–200° C. boiling range gasoline fraction at 250° C. and 66 atm. gage pressure]

| Run No. | Gasoline Fraction | Hydrolysis Medium | Ratio Hydolysis Med./ Hydrocarbon | Contact Time in Min. | Mol Percent Ester Hydrolyzed | Oxygenated Compounds Extracted by Hydrolysis Medium, Mol Percent | | Concentration of Oxygenated Compounds in Hydrolysis Medium, Wt. Percent | |
|---|---|---|---|---|---|---|---|---|---|
| | | | | | | Un-Hydrolyzed Esters | Acids | Esters (as C₆) | Acids (as butyric) |
| 464–125 | Acids present [a] | Water | 2.0 | [c] 180 | 22.0 | | | | |
| 464–159 | do | do | 2.0 | [c] 60 | 20.0 | 5.0 | | | |
| 464–149 | Acid free [b] | do | 2.0 | [c] 180 | 17.0 | 5.0 | | | |
| 464–147 | do | 5% salt solution [e] | 2.0 | [c] 180 | 58.5 | | 63.0 | | 0.31 |
| 464–155 | do | do | 2.0 | [c] 60 | 47.0 | | 63.0 | | 0.26 |
| 464–153 | Acids present | do | 2.0 | [c] 60 | 11.0 | | 63.0 | | 1.60 |
| 513–43 | do | 50% salt solution | 2.0 | [c] 60 | [d]+16.0 | [f] 61.0 | [f] 90.0 | 0.72 | 1.70 |
| 513–55 | Acid free | do | 2.0 | [c] 60 | 57.0 | 45.0 | 80.0 | 0.19 | 0.31 |
| 513–77 | Acids present | Water | 2.0 | [g] 30 | [d]+13.0 | 13.0 | 57.0 | 0.23 | 1.40 |
| 513–81 | Acid free | 10% solution | 2.0 | [g] 30 | 59.0 | 18.0 | 57.0 | 0.08 | 0.24 |
| 513–99 | do | do | 2.0 | [g] 15 | 56.6 | 14.0 | 57.0 | 0.08 | 0.30 |
| 513–85 | do | do | 2.0 | [g] 10 | 52.5 | 18.0 | 57.0 | 0.11 | 0.27 |
| 513–93 | do | do | 2.2 | [g] 5 | 43.0 | 17.0 | 63.0 | 0.10 | 0.22 |
| 513–107 | do | do | 0.7 | [g] 30 | 42.8 | 4.0 | 33.0 | 0.08 | 0.40 |
| 513–111 | do | do | 4.0 | [g] 30 | 62.0 | 38.0 | 80.0 | 0.06 | 0.17 |
| 513–129 [h] | do | do | 2.0 | [g] 10 | 25.0 | 5.0 | 53.0 | 0.00 | 0.12 |
| 513–125 [i] | do | do | 2.0 | [g] 30 | 45.0 | 31.0 | 40.0 | 0.09 | 0.09 |
| 513–121 [j] | Acids present | do | 2.0 | [g] 30 | 47.0 | 27.0 | 65.0 | 0.10 | 0.47 |
| 513–117 [j] | do | Water | 2.0 | [g] 30 | 15.0 | 5.0 | 62.0 | 0.04 | 0.41 |

[a] Acids originally present. Gasoline fraction contains about 2.0 wt. percent ester as C₆.
[b] Acids removed with approximately 2 N aqueous caustic at room temperature. Ester content remained essentially the same. Part of the alcohols were also extracted by the caustic.
[c] These contact times do not include 1.75 hours required to bring bomb containing hydrolysis medium and hydrocarbon feed to desired temperature.
[d] Plus sign designates amounts of additional esters produced.
[e] Salt solutions consist of sodium salts of the acids present in the gasoline fraction.
[f] The extent of the other oxygenated compounds extracted was as follows: 50% of the alcohols and about 35% of the carbonyls.
[g] These are actual contact times at 250° C. Bomb containing hydrolysis medium was heated to 250° C. prior to introducing hydrocarbon phase.
[h] Run made at 200° C. and 900 lbs./sq. in. gage pressure.
[i] Feed consisted of acid-free oil—boiling range 25° C. to about 400° C. Ester content about 1.3 wt. percent as C₆.
[j] 30 mol percent of original acids present. 70.0 mol percent of acids extracted with water at 250° C. prior to hydrolysis run.

The solvent extraction process of this invention may be carried out in the conventional type solvent extraction apparatus. For example, the feed is introduced into a solvent extraction tower at a point near the midsection thereof and contacted, preferably countercurrently by an aqueous solution of a salt of at least one organic acid of 3 to about 12 carbon atoms at a temperature between the freezing point of the solvent and the critical temperature, preferably References Cited in the file of this patent

UNITED STATES PATENTS

| Number | Name | Date |
|---|---|---|
| 2,274,750 | Soenksen et al. | Mar. 3, 1942 |
| 2,452,121 | Grahame | Oct. 26, 1948 |
| 2,470,782 | McGrath et al. | May 24, 1949 |
| 2,494,371 | Wadley | Jan. 10, 1950 |